(12) United States Patent
Kwon et al.

(10) Patent No.: US 10,818,942 B2
(45) Date of Patent: Oct. 27, 2020

(54) METHOD AND SYSTEM FOR ESTIMATING HYDROGEN CONCENTRATION OF FUEL CELL

(71) Applicants: Hyundai Motor Company, Seoul (KR); Kia Motors Corporation, Seoul (KR)

(72) Inventors: Soon Woo Kwon, Gyeonggi-do (KR); In Woo Jang, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 136 days.

(21) Appl. No.: 16/055,391

(22) Filed: Aug. 6, 2018

(65) Prior Publication Data

US 2019/0288310 A1    Sep. 19, 2019

(30) Foreign Application Priority Data

Mar. 14, 2018    (KR) .......................... 10-2018-0029638

(51) Int. Cl.
*H01M 8/0444*    (2016.01)
*H01M 8/04791*   (2016.01)
*H01M 8/0438*    (2016.01)

(52) U.S. Cl.
CPC ..... *H01M 8/04447* (2013.01); *H01M 8/0441* (2013.01); *H01M 8/04388* (2013.01); *H01M 8/04432* (2013.01); *H01M 8/04455* (2013.01); *H01M 8/04462* (2013.01); *H01M 8/04798* (2013.01); *H01M 8/04805* (2013.01); *H01M 2250/20* (2013.01)

(58) Field of Classification Search
None
See application file for complete search history.

(56) References Cited

U.S. PATENT DOCUMENTS

| 8,195,407 B2 | 6/2012 | Salvador et al. |
|---|---|---|
| 2013/0137007 A1 | 5/2013 | Lee et al. |
| 2017/0084941 A1 | 3/2017 | Cai et al. |

FOREIGN PATENT DOCUMENTS

| JP | 2004-185974 A | 7/2004 |
|---|---|---|
| JP | 2006-221980 A | 8/2006 |
| JP | 2006-324058 A | 11/2006 |
| JP | 2008-047518 A | 2/2008 |

(Continued)

OTHER PUBLICATIONS

Cha, S (2016). Fuel Cell Fundamentals. (3rd ed.) (pp. 272-294, 346, 431-449) (Year: 2016).*

*Primary Examiner* — Daniel S Gatewood
(74) *Attorney, Agent, or Firm* — Mintz Levin Cohn Ferris Glovsky and Popeo, P.C.; Peter F. Corless

(57) ABSTRACT

A method for estimating a hydrogen concentration of a fuel cell includes estimating an initial amount of gas included at an anode side of a fuel cell, calculating a crossed over amount of gas between the anode side and a cathode side of the fuel cell and an amount of gas purged from the anode side to the outside from time when an initial amount of gas is predicted to a present time, and estimating a current hydrogen concentration at the anode side based on the predicted initial amount of gas, the calculated amount of crossed over gas, and the amount of purged gas.

7 Claims, 6 Drawing Sheets

(56) References Cited

FOREIGN PATENT DOCUMENTS

| JP | 2009-059556 | A | 3/2009 |
|----|-------------|-----|---------|
| JP | 5502553 | B2 | 5/2014 |
| KR | 10-1459815 | B1 | 11/2014 |

\* cited by examiner

METHOD AND SYSTEM FOR ESTIMATING HYDROGEN CONCENTRATION OF FUEL CELL

CROSS REFERENCE TO RELATED APPLICATION

The present application claims under 35 U.S.C. § 119(a) the benefit of Korean Patent Application No. 10-2018-0029638 filed on Mar. 14, 2018, the entire contents of which are incorporated by reference herein.

BACKGROUND (a) Technical Field

The present disclosure relates to a method and a system for estimating a hydrogen concentration of a fuel cell, and more particularly, to a technique for estimating the hydrogen concentration at an anode of the fuel cell by calculating an amount of crossed over gas and an amount of purged gas, and controlling the hydrogen concentration according to a predetermined target hydrogen concentration for each output current of the fuel cell.

(b) Description of the Related Art

A fuel cell converts chemical energy into electrical energy using an oxidation-reduction reaction of hydrogen and oxygen, which are respectively supplied from a hydrogen supply device and an air supply device, and includes a fuel cell stack configured to generate electric energy and a cooling system configured to cool the fuel cell stack.

In particular, hydrogen is supplied to an anode of the fuel cell, and an oxidation reaction of hydrogen proceeds at the anode to generate hydrogen ions (protons) and electrons, and at this point, the generated hydrogen ions and the generated electrons respectively move to a cathode through an electrolyte membrane and a separation plate. At the cathode, water is generated through an electrochemical reaction in which the hydrogen ions and the electrons, which are moved from the anode, and oxygen in the air, and electric energy is generated from a flow of the electrons.

Among the hydrogen and the oxygen, since the hydrogen supplied to the anode of the fuel cell should be kept at an appropriate level of hydrogen concentration, hydrogen purge control is performed in a hydrogen recirculation line. The hydrogen purge control is generally performed to estimate a hydrogen concentration in real time and maintain an appropriate level of hydrogen concentration according to the estimated hydrogen concentration.

In the related art, since there is no method of estimating a hydrogen concentration at an anode side of a fuel cell stack, a Q value is defined by integrating an output current of a fuel cell over time and multiplying the integrated output current by a weighting factor, and when the Q value reaches a reference value which is experimentally determined, purge control is performed to maintain a hydrogen concentration at the anode side of the fuel cell stack (i.e., current integration control).

However, in the conventional purge control method, a relationship between a hydrogen concentration, which is an actual control target, and the Q value is not clear, and thus a reference of a target hydrogen concentration (or a target hydrogen pressure) is not clear such that there is a problem in that hydrogen concentration control is impossible.

Further, there are problems in that the Q value does not increase in a section in which an output current of the fuel cell is zero (e.g., an idle stop section and the like), such that purging cannot be performed and a hydrogen concentration of the fuel cell cannot be kept appropriate according to situations of the fuel cell where a vehicle is traveling at a high speed or in city driving.

The foregoing is intended merely to aid in the understanding of the background of the present disclosure, and is not intended to mean that the present disclosure falls within the purview of the related art that is already known to those skilled in the art.

SUMMARY

The present disclosure proposes a control technique for directly estimating a hydrogen concentration at an anode side of a fuel cell to accurately converge the hydrogen concentration on a target hydrogen concentration (or a target hydrogen pressure) at the anode side.

According to one aspect, there is provided a method for estimating a hydrogen concentration in a fuel cell, the method including predicting an initial amount of gas contained at an anode side of the fuel cell, calculating an amount of gas crossed over between the anode side and a cathode side of the fuel cell and an amount of gas purged from the anode side to the outside from a prediction time of the initial amount of gas to a current time, and estimating a current hydrogen concentration at the anode side based on the predicted initial amount of gas, the calculated amount of crossed over gas, and the amount of purged gas.

The predicting of the initial amount of gas may include predicting the initial amount of gas at the anode side of the fuel cell based on a previously estimated concentration of the gas or using stop time data of the fuel cell or current state data of the fuel cell when the fuel cell is re-started.

The calculating of the amount of crossed over gas and the amount of purged gas may include integrating a gas diffusion rate over time due to a gas partial pressure difference between the anode side and the cathode side to calculate the amount of crossed over gas.

The gas diffusion rate may be inversely proportional to a thickness of the electrolyte membrane of the fuel cell stack and may be proportional to the gas partial pressure difference between the anode side and the cathode side.

The gas diffusion rate may be proportional to the gas diffusion coefficient, and the gas diffusion coefficient is varied according to a water content and a temperature of the electrolyte membrane disposed between the anode side and the cathode side of the fuel cell.

The calculating of the amount of crossed over gas and the amount of purged gas may include calculating a purge rate of each gas by multiplying a total gas purge rate by a mole fraction of each gas and calculating the amount of purged gas by integrating the purge rate of each gas over time.

The total gas purge rate may be proportional to a pressure difference between a gas pressure at the anode side and a gas pressure at the outside.

The predicting of the initial amount of gas may include predicting an initial amount of nitrogen and an initial amount of vapor at the anode side, respectively, the calculating of the amount of crossed over gas and the amount of purged gas may include calculating an amount of crossed over nitrogen and an amount of crossed over vapor, and an amount of purged nitrogen and an amount of purged vapor, at the anode side, respectively, and the estimating of the current hydrogen concentration at the anode side may include calculating a current amount of nitrogen at the anode side based on the initial amount of nitrogen, the amount of crossed over nitrogen, and the amount of purged nitrogen, calculating a current amount of vapor at the anode side based on a predicted initial amount of vapor, the amount of crossed over vapor, and the amount of purged vapor, and estimating a current hydrogen concentration at the anode side using the current amount of nitrogen, the current amount of vapor, and a total gas amount at the anode side.

According to another aspect, there is provided a system for estimating a hydrogen concentration in a fuel cell, the system including an initial amount prediction part configured to predict an initial amount of gas contained at an anode side of the fuel cell, a crossover calculator configured to calculate an amount of gas crossed over between the anode side and a cathode side of the fuel cell and an amount of gas purged from the anode side to the outside from a prediction time of the initial amount of gas to a current time, a purge calculator configured to calculate an amount of gas purged from the anode side to the outside from an initial amount prediction time to a current time, and a concentration estimator configured to estimate a current hydrogen concentration at the anode side based on the predicted initial amount of gas, the calculated amount of mimed over gas, and the amount of purged gas.

The initial amount prediction part may predict the initial amount of gas based on a previously estimated concentration of the gas or predicts an initial concentration of gas using stop time data of the fuel cell or current state data of the fuel cell when the fuel cell is re-started.

The crossover calculator may integrate a gas diffusion rate over time due to a gas partial pressure difference between the anode side and the cathode side to calculate the amount of crossed over gas.

The purge calculator may calculate a purge rate of each gas by multiplying a total gas purge rate by a mole fraction of each gas and calculate the amount of purged gas by integrating the purge rate of each gas over time.

The initial amount prediction part may predict an initial amount of nitrogen and an initial amount of vapor at the anode side, the crossover calculator may calculate an amount of crossed over nitrogen and an amount of missed over vapor at the anode side, the purge calculator may calculate an amount of purged nitrogen and an amount of purged vapor at the anode side, the concentration estimator may calculate a current amount of nitrogen at the anode side based on the initial amount of nitrogen, the amount of crossed over nitrogen, and the amount of purged nitrogen, calculate a current amount of vapor at the anode side based on an initial amount of vapor, the amount of crossed over vapor, and the amount of purged vapor, and estimate a current hydrogen concentration at the anode side using the current amount of nitrogen, the current amount of vapor, and a total gas amount at the anode side.

According to still another aspect, there is provided a method for estimating a hydrogen concentration of a fuel cell, the method including estimating a current hydrogen concentration at an anode side using an initial amount of gas contained at the anode side of the fuel cell, an amount of gas crossed over between the anode side and a cathode side of the fuel cell from an initial amount prediction time to a current time, and an amount of gas purged from the anode side to the outside.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
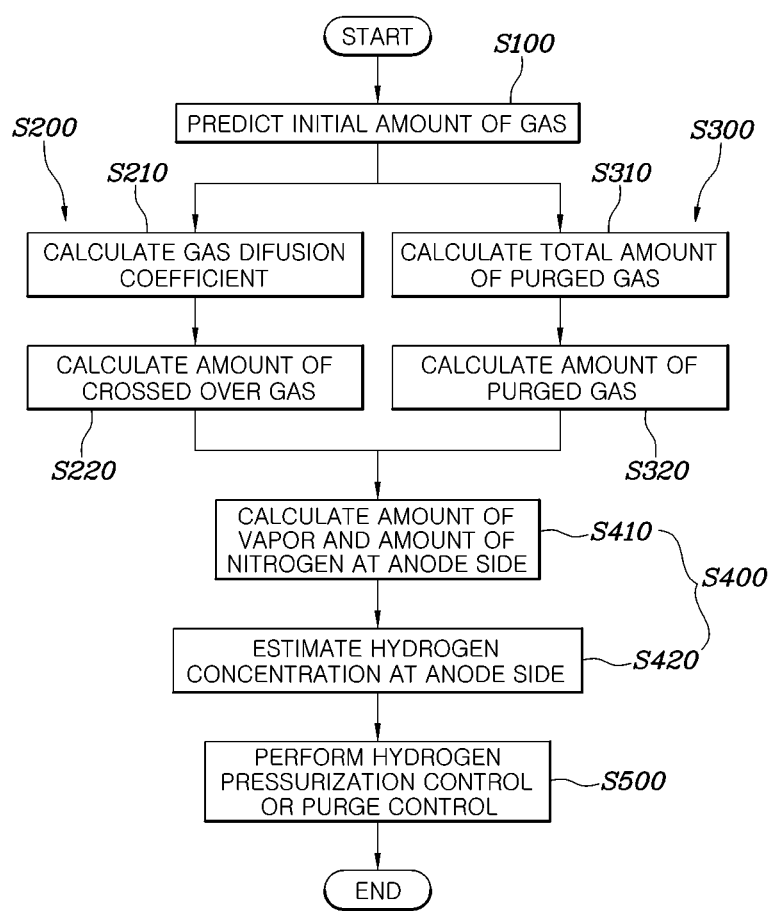
FIG. 1 is a flowchart of a method of estimating a hydrogen concentration of a fuel cell according to one embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

Hereinafter, preferred embodiments of the present disclosure will be described in detail with reference to the accompanying drawings. Like reference numerals denote like members throughout the drawings.

FIG. 1 is a flowchart of a method of estimating a hydrogen concentration of a fuel cell according to one embodiment of the present disclosure.

Referring to FIG. 1, a method of estimating a hydrogen concentration of a fuel cell according to one embodiment of the present disclosure includes estimating an initial amount of gas included at an anode side of a fuel cell (S100), calculating a crossed over amount of gas between the anode side and a cathode side of the fuel cell (S200) and an amount of gas purged from the anode side to the present (S300) from a time when an initial amount of gas is predicted to a present time, estimating a current hydrogen concentration at the anode side in the basis of the predicted initial amount of gas, the calculated amount of crossed over gas, and the amount of purged gas (S400).

In the present disclosure, it is assumed that a gas at the anode side of the fuel cell contains only hydrogen, nitrogen, and vapor. Although one or more other gases may be included in a remaining gas, an amount of the remaining gas will be negligible and can be ignored. Further, a gas concentration in the fuel cell stack may refer to a corresponding amount (moles) of a corresponding gas in a total gas amount (moles) including hydrogen, nitrogen, and vapor. That is, a gas concentration may refer to a mole fraction of a corresponding gas.

According to the method for estimating a hydrogen concentration of a fuel cell according to one embodiment of the present disclosure is capable of estimating a reliable current hydrogen concentration by calculating an amount of an introduced or discharged gas from an initial amount of gas contained at the anode side of the fuel cell. Accordingly, it is possible to accurately estimate a hydrogen concentration in all sections in addition to a section where a generated current of the fuel cell is zero, and thus control an optimum hydrogen concentration to be maintained, such that there is an effect of contributing to improvement of durability and fuel efficiency of the fuel cell.

The operation S100 of predicting the initial amount of gas may include predicting the initial amount of gas based on a previously estimated concentration of the gas or using stop time data of the fuel cell or current state data of the fuel cell when the fuel cell is re-started. Here, the initial amount of gas may be obtained by estimating one or more of an initial amount of hydrogen, an initial amount of nitrogen, and an initial amount of vapor.

When the fuel cell is generating power, an amount of gas or a concentration of gas included in the fuel cell stack may be continuously estimated. However, when starting of the fuel cell is stopped or power generation is stopped (in a stop mode and the like), estimation of the amount of gas or a gas concentration in the fuel cell stack may be stopped.

That is, when the fuel cell is continuously operated, an initial amount of gas may be predicted based on a previously estimated concentration of gas included in the fuel cell stack. However, when the fuel cell is re-started, since there is no previously estimated gas information in the fuel cell stack or even when the previously estimated gas information may not be accurate, the initial amount of gas may be predicted using stop time data or current state data of the fuel cell.

Specifically, when the fuel cell is re-started and a stop time of the fuel cell is equal to or less than a predetermined time (e.g., one hour), the initial amount of gas may be predicted based on a concentration of the gas included in the fuel cell stack, which is estimated before the stoppage of the fuel cell. However, when the stop time of the fuel cell exceeds the predetermined time (e.g., one hour), the concentration of the gas may be varied due to a crossover or the like.

Figure 2:
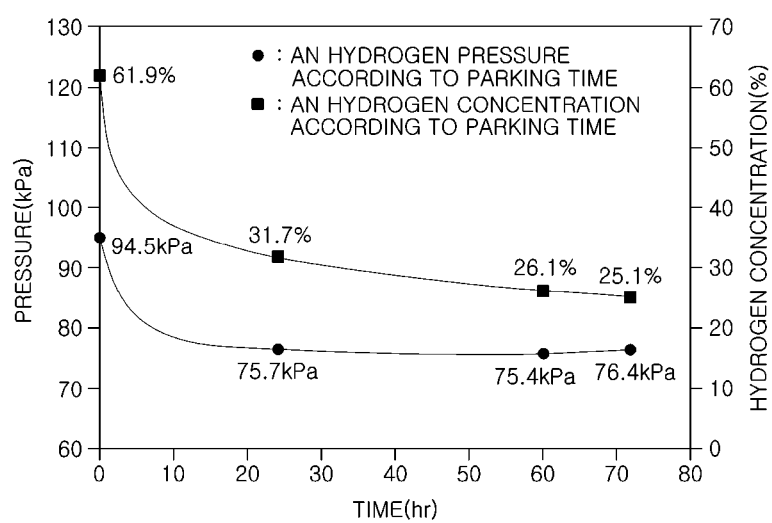
FIG. 2 is a graph illustrating a hydrogen pressure and a hydrogen concentration at an anode side of a fuel cell according to a parking time of the fuel cell.

FIG. 2 is a graph illustrating a hydrogen pressure and a hydrogen concentration at an anode side of a fuel cell according to a parking time of the fuel cell.

Referring to FIG. 2, it can be seen that a hydrogen pressure and a hydrogen concentration at the anode side of the fuel cell decrease according to the stop time of the fuel cell. Therefore, the initial amount of hydrogen at a time when the fuel cell is re-started may be estimated by storing pre-mapped data relating to the hydrogen concentration at the anode side of the fuel cell according to the stop time of the fuel cell and using the stop time data of the fuel cell.

Further, when the fuel cell is re-started, an amount of vapor at the anode side may be significantly affected by an inner temperature of the fuel cell. Therefore, when the fuel cell is re-started, the amount of vapor at the time when the fuel cell is re-started may be predicted using the current state data of the fuel cell, which includes a current temperature.

At this point, assuming that an interior of the fuel cell stack is saturated at a relative humidity of 100%, the amount of vapor may be predicted using a saturated vapor at a corresponding temperature. The inner temperature of the fuel cell may be inferred through a temperature of a cooling water outlet, wherein the cooling water cools the fuel cell.

Therefore, when the fuel cell is re-started, the amount of vapor at the anode side may be predicted first using the current state data of the fuel cell, which includes the current temperature at the time when the fuel cell is re-started, and then an amount of hydrogen at the anode side of the fuel cell may be predicted using the stop time data of the fuel cell and the pre-mapped data with respect to the hydrogen concentration at the anode side of the fuel cell according to the stop time of the fuel cell.

Further, as will be described below, an amount of nitrogen may be estimated by calculating a total amount of gas at the anode side and subtracting the amount of vapor and the amount of hydrogen at the anode side from the total amount of gas.

In another embodiment, the amount of nitrogen at a time when the fuel cell is re-started may be estimated by storing pre-mapped data relating to a nitrogen concentration at the anode side of the fuel cell according to the stop time of the fuel cell and using the stop time data of the fuel cell.

Figure 3:
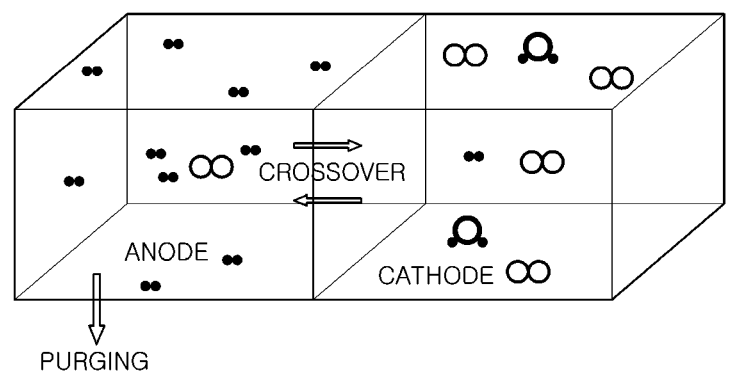
FIG. 3 is a diagram illustrating a modeling of the anode side and a cathode side of the present disclosure.

FIG. 3 is a diagram illustrating a modeling of the anode side and a cathode side of the present disclosure.

Referring to FIG. 3, the anode side (a hydrogen supply system) for supplying hydrogen to the fuel cell stack and the cathode side (an air supply system) for supplying oxygen to the fuel cell stack are respectively modeled as simplified hexahedron enclosures, and it is assumed that a variation in amount of gas included in each model may be assumed due to a crossover generated between the anode side and the cathode side and purging performed at the anode side. Here, it is assumed that a gas composition, a pressure, a temperature, and the like inside the anode side and the cathode side are all the same.

The total amount of gas $\eta_{An}$ at the anode side may be estimated using a pressure P, a volume V, and a temperature T of overall gas at the anode side gas as shown in the following equation.

$$n_{An} = \frac{P_{An} V_{An}}{RT} \text{ [mol]}$$

Here R is a gas constant and is 8.314 J/mol·K.

The operations S200 and S300 of calculating the amount of crossed over gas and the amount of purged gas may include calculating the amount of gas crossed over by integrating a gas diffusion rate over time due to a gas partial pressure difference between the anode side and the cathode side (S200). A gas partial pressure at each of the anode side and the cathode side may be estimated using the previously estimated gas concentration, or when the fuel cell is re-started, be estimated from the initial amount of gas which is predicted using the stop time data of the fuel cell or the current state data of the fuel cell.

The gas diffusion rate may be inversely proportional to a thickness of the electrolyte membrane of the fuel cell stack and be proportional to the gas partial pressure difference between the anode side and the cathode side (S220).

Specifically, the amount of crossed over gas may be calculated by applying the following FICK's LAW (diffusion law).

$$\frac{\dot{m}}{A} = -D \frac{\partial c}{\partial x} = -D \frac{M}{RT} \frac{\partial P}{\partial x}$$

Here, $\bar{m}$ (g/s) is a mass diffusion rate of gas, A is a diffusion area, D is a gas diffusion coefficient, x is a diffusion length, c is a gas concentration, R is a universal gas constant (8.314 J/mol·K), P is a gas pressure, T is a gas temperature, and M is a molar mass of the gas (g/mol).

These may be summarized as follows.

$$\dot{m} = -D \frac{M}{RT} \frac{\partial P}{\partial x} A = \dot{n} \cdot M$$

$$\dot{n} = -D \frac{1}{RT} \frac{\partial P}{\partial x} A$$

Here, $\bar{\eta}$ is a gas diffusion rate (mol/s).

Therefore, the amount of crossed over gas between the electrolyte membranes of the fuel cell stack may be calculated by the following equation.

$$n_{N2\_xo} = \frac{D_{N2}}{RT} \frac{P_{Ca,N2} - P_{An,N2}}{\delta} A$$

Here, the symbols used in the equations are as follows.

$\eta_{N2\_xo}$ is a diffusion rate of nitrogen, P is a pressure (kPa), R is a gas constant (8.314 J/mol/K), T is a temperature (K), D is a diffusion coefficient, A is an area of an electrolyte membrane, δ is a thickness of an electrolyte membrane, $P_{Ca,H2}$ is an nitrogen partial pressure at the cathode side of the fuel cell, and. $P_{An,H2}$ is an nitrogen partial pressure of the anode side of the fuel cell.

$$n_{V\_xo} = \frac{D_V}{RT} \frac{P_{Ca,V} - P_{An,V}}{\delta} A$$

Here, the symbols used in the equations are as follows.

$\bar{n}_{v\_xo}$ is a diffusion rate of vapor, P is a pressure (kPa), R is a gas constant (8.314 J/mol/K), T is a temperature (K), D is a diffusion coefficient, A is an area of an electrolyte membrane, δ is a thickness of an electrolyte membrane, $P_{Ca,V}$ is an nitrogen partial pressure at the cathode side of the fuel cell, and $P_{An,V}$ is an nitrogen partial pressure of the anode side of the fuel cell.

As opposed to these, the hydrogen may be crossed over from the anode side to the cathode side of the fuel cell.

$$n_{H2\_xo} = \frac{D_{H2}}{RT} \frac{P_{An,H2} - P_{Ca,H2}}{\delta} A$$

Here, $\eta_{H2\_xo}$ is a diffusion rate of hydrogen, P is a pressure (kPa), R is a gas constant (8.314 J/mol/K), T is a temperature (K), D is a diffusion coefficient, A is an area of an electrolyte membrane, is a thickness of an electrolyte membrane, $P_{An,H2}$ is a hydrogen partial pressure at the anode side of the fuel cell, and. $P_{Ca,H2}$ is a hydrogen partial pressure of the cathode side of the fuel cell.

Further, the gas diffusion rate is proportional to the gas diffusion coefficient, and the gas diffusion coefficient may be varied according to a water content and a temperature of the electrolyte membrane disposed between the anode side and the cathode side of the fuel cell (S210).

Although the gas diffusion coefficient D may be a fixed constant value, in order to increase the accuracy, the gas diffusion coefficient D may be a value which is varied according to states of a degree of degradation and a temperature of the fuel cell.

In particular, the gas diffusion coefficient D may be calculated using a value which is varied according to the water content and the temperature of the electrolyte membrane disposed between the anode side and the cathode side of the fuel cell (S210). That is, the gas diffusion coefficient D may be pre-mapped through a gas permeation amount according to the water content (humidity) and the temperature of the electrolyte membrane and may be calculated according to a current water content and a current temperature of the electrolyte membrane. The temperature of the electrolyte membrane may be inferred through a temperature of a cooling water outlet of the fuel cell.

That is, the gas diffusion coefficient D is calculated and pre-mapped by deriving the diffusion coefficient according to the water content and the temperature of the electrolyte membrane through a diffused movement amount of the gas using reverse of FICK's LAW (diffusion law), and the gas diffusion coefficient D may be applied according to the current water content and the current temperature of the electrolyte membrane.

Further, the gas diffusion coefficient D may be calculated as being varied as the electrolyte membrane of the fuel cell stack is degraded.

Further, the operations S200 and S300 of calculating the amount of crossed over gas and the amount of purged gas may include calculating a purge rate of the purged gas by multiplying a mole fraction of each gas by an overall purge rate of gas and integrating a purge rate of each gas over time (S300). That is, calculating the total purge amount (S310), and calculating the amount of purged gas by multiplying the total purge amount by the mole fraction of each gas (S320) are included.

Here, the purged gas may be discharged to the outside from the anode side of the recirculation line which is recirculated after passing through the fuel cell stack, and specifically, the outside discharging the purged gas may be an air outlet at the cathode side through the fuel cell stack.

The total gas purge rate $\eta_{\bar{p}urge}$ may be proportional to a pressure difference between a gas pressure at the anode side $P_{An}$ and a gas pressure at the outside. $P_{out}$. The gas pressure $P_{out}$ at the outside may be the gas pressure at the cathode side. A concrete equation may be as follows.

$$\eta_{\bar{p}urge} = C(P_{An} - P_{out})$$

Here, C is a purge gain value which may be determined by a purge period, an opening degree of a purge valve when purging, an opening time of the purge valve, and the like.

Assuming that the gas at the anode side has the same gas composition, the purge rate of each gas may be calculated by multiplying the total gas purge rate by the mole fraction (S320). The mole fraction of each gas may use the gas concentration at the anode side according to the initial amount.

Specifically, the purge rate of each gas may be calculated by the following equation (a nitrogen purge rate. $\eta_{N2\_\bar{p}urge}$, a vapor purge rate $\eta_{V\_\bar{p}urge}$, a hydrogen purge rate $\eta_{H2\_\bar{p}urge}$).

$$\dot{n}_{N2\_purge} = \dot{n}_{purge} \cdot \frac{n_{N2}}{n_{An}}$$

$$\dot{n}_{V\_purge} = \dot{n}_{purge} \cdot \frac{n_V}{n_{An}}$$

$$\dot{n}_{H2\_purge} = \dot{n}_{purge} \cdot \frac{n_{H2}}{n_{An}}$$

In one embodiment, the operation S100 of predicting the initial amount of gas may include estimating an initial amount of nitrogen and an initial amount of vapor at the anode side, the operations S200 and S300 of calculating the amount of crossed over gas and the amount of purged gas may include calculating the amount of crossed over nitrogen, and the amount of vapor, the amount of purged nitrogen, and the vapor at the anode side, and the operation S400 of estimating the current hydrogen concentration at the anode side may include calculating a current amount of nitrogen at the anode side based on the initial amount of nitrogen, the amount of crossed over nitrogen, and the amount of purged amount and calculating a current amount of vapor at the anode side based on the estimated initial amount of vapor, an amount of crossed over vapor, and the amount of purged vapor (S410), and estimating a current hydrogen concentration at the anode side using the current amount of nitrogen, the current amount of vapor, and a total amount of gas at the anode side (S420).

As described above, the total amount of gas at the anode side may be calculated using the pressure and a volume value at the anode side from an ideal gas state equation.

That is, the current amount of nitrogen $\eta_{N2}$ and the current amount of vapor $\eta_V$ at the anode side may be calculated and the current amount of nitrogen. $\eta_{N2}$ and the current amount of vapor $\eta_V$ may be subtracted from the total amount of gas $\eta_{An}$ at the anode side to calculate the current amount of hydrogen $\eta_{H2}$ at the anode side, and thus a current hydrogen concentration $$\frac{n_{H2}}{n_{An}}$$

may be estimated.

$$\frac{n_{H2}}{n_{An}} = 1 - \frac{n_{N2}}{n_{An}} - \frac{n_V}{n_{An}}$$

As described above, the current amount of nitrogen $\eta_{N2}$ and the current amount of vapor $\eta_V$ may be calculated by predicting the initial amount of nitrogen and the initial amount of vapor at the anode side and calculating the amount of crossed over nitrogen and the amount of crossed over vapor, and the amount of the purged nitrogen and the amount of purged vapor at the anode side. The amount of crossed over nitrogen and the amount of crossed over vapor, and the amount of the purged nitrogen and the amount of purged vapor at the anode side may be respectively calculated by integrating the gas diffusion rate and the gas purge rate over time.

A concrete equation is as follows.

$$\eta_{N2} = \eta_{N2\_init} + \int (\eta_{\overline{N2}\_xo} - \bar{\dot{n}}_{N2\_purge}) dt$$

$$\eta_V = \eta_{V\_init} + \int (\eta_{\overline{V}\_xo} - \bar{\dot{n}}_{V\_purge}) dt$$

That is, the current amount of hydrogen $\eta_{H_2}$ at the anode side may be estimated by a method of subtracting the current amount of nitrogen $\eta_{N_2}$ and the current amount of vapor V from the total gas amount $\eta_{An}$ at the anode side. Accordingly, there are effects in that the calculation process is simplified, and specifically, an error caused by the estimation of the current amount of nitrogen $\eta_{N_2}$ and the current amount of vapor $\eta_V$ are offset and thus the hydrogen concentration may be stably and robustly estimated.

As another embodiment, a current hydrogen concentration may be directly estimated using the initial amount of hydrogen, the amount of crossed over hydrogen, and the amount of purged hydrogen. Specifically, the operation S100 of predicting the initial amount may include predicting the initial amount of hydrogen, and the operations S200 and S300 of calculating the amount of crossed over gas and the amount of purged gas may include calculating an amount of hydrogen crossed over from the anode side to the cathode side and the amount of hydrogen purged from the anode side to the outside.

The operation S400 of estimating the current hydrogen concentration at the anode side may calculate the current amount of hydrogen $\eta_{H2}$ at the anode side by the following equation.

$$\eta_{H2} = \eta_{H2\_init} - \int (\eta_{\overline{H2}\_xo} + \eta_{H2\_\bar{p}urge}) dt$$

Here, $\eta_{H2}$ is the current amount of hydrogen at the anode side. $\eta_{H2\_init}$ is the initial amount of hydrogen at the anode side. $\eta_{\overline{H2}\_xo}$ is a diffusion rate (hydrogen crossover rate), and $\eta_{H2\_\bar{p}urge}$ is a hydrogen purge rate.

Further, the operation S400 of estimating the current hydrogen concentration at the anode side may include estimating a current hydrogen concentration $\eta_{H2}$ using the total amount of gas $\eta_{An}$ at the anode side, which is calculated using the pressure and the volume value at the anode side from the ideal gas state equation and using a current amount of hydrogen $\eta_{H2}$.

As still another embodiment, the current amount of vapor $\eta_V$ at the anode side may be calculated as a value which is varied according to the temperature and the output current of the fuel cell stack.

Figure 4:
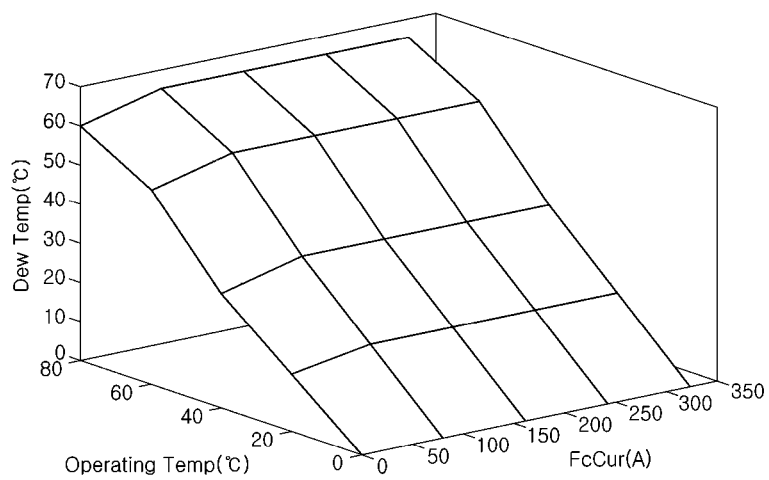
FIG. 4 is a graph illustrating a dew point temperature varied according to an operating temperature and an output current of the fuel cell.

FIG. 4 is a graph illustrating a dew point temperature varied according to an operating temperature and an output current of the fuel cell.

Referring to FIG. 4, the current amount of vapor $\eta_V$ at the anode side may be assumed as a vapor amount corresponding to the dew temperature. As shown in FIG. 4, the dew temperature may be varied by the operating temperature and the output current of the fuel cell. Therefore, the current amount of vapor $\eta_V$ may be simply calculated using the temperature and the output current of the fuel cell.

That is, the method of estimating a hydrogen concentration of a fuel cell according to one embodiment of the present disclosure may estimate a current hydrogen concentration at the anode side using an initial amount of gas that contained in a fuel cell stack 10, an amount of gas crossed over between the anode side and the cathode side from an initial amount estimation time and a current time, and an amount of gas purged from the anode side to the outside.

Figure 5:
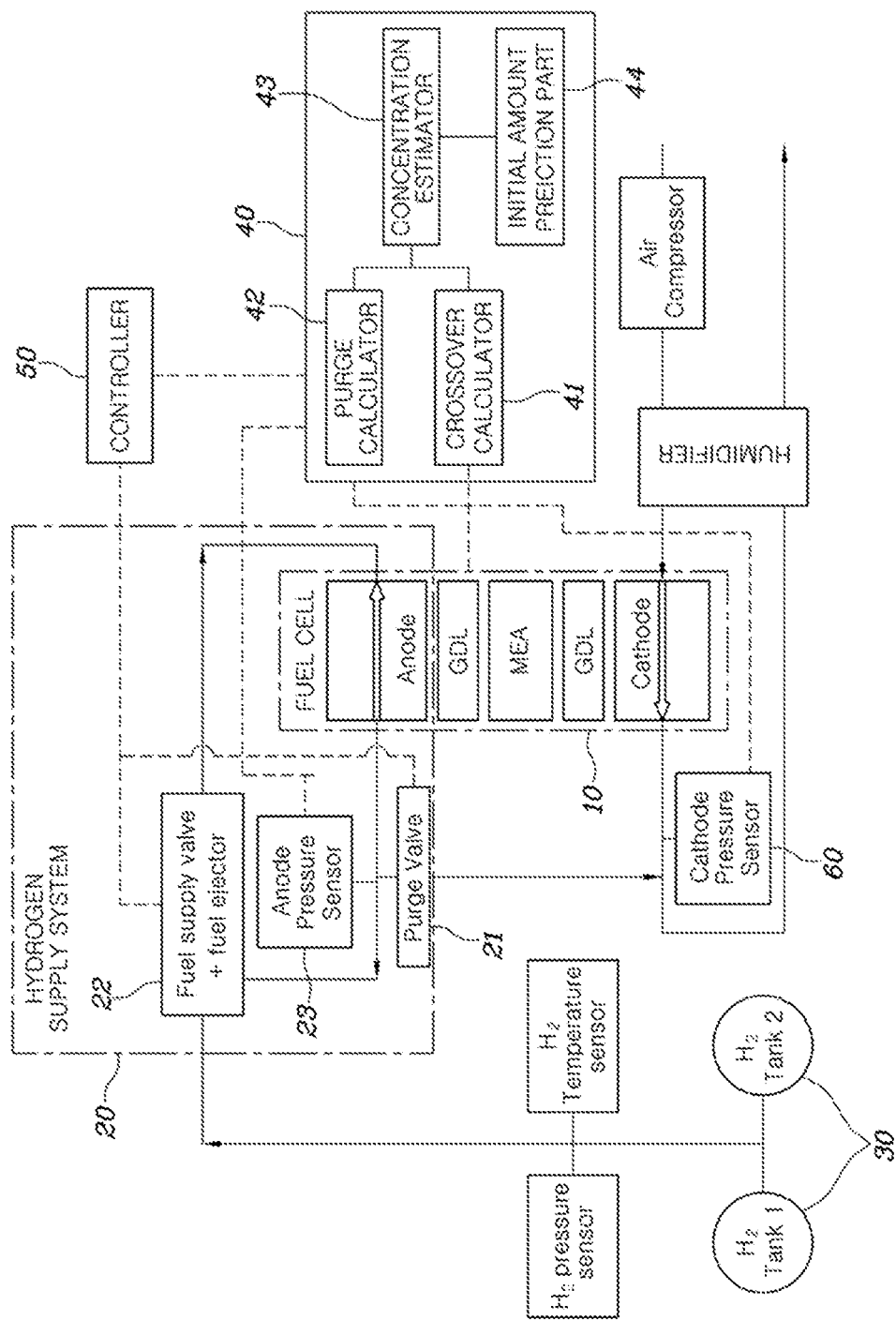
FIG. 5 is a block diagram of a hydrogen concentration control system including a hydrogen concentration estimation system according to one embodiment of the present disclosure.

FIG. 5 is a block diagram of a hydrogen concentration control system including a hydrogen concentration estimation system 40 according to one embodiment of the present disclosure.

Referring to FIG. 5, the hydrogen concentration control system includes the fuel cell stack 10, the hydrogen supply system 20 for supplying hydrogen to the fuel cell stack 10, a hydrogen tank 30 for supplying hydrogen to the hydrogen supply system 20, a hydrogen concentration estimation system 40 for estimating a hydrogen concentration at the anode side of the fuel cell, and a controller 50 for controlling the hydrogen supply system 20 based on the hydrogen concentration estimated by the hydrogen concentration estimation system 40.

Specifically, the hydrogen concentration estimation system 40 according to one embodiment of the present disclosure may include an initial amount prediction part 44 configured to predict an initial amount of gas contained in the fuel cell stack 10, a crossover calculator 41 configured to calculate an amount of gas crossed over between the anode side and the cathode side of the fuel cell from the initial amount prediction time to a current time, a purge calculator 42 configured to calculate the amount of gas purged from the anode side to the outside from the initial amount prediction time to the current time, and a concentration estimator 43 configured to estimate the current hydrogen content at the anode side based on the initial amount of gas predicted by the initial amount prediction part 44, the amount of crossed over gas calculated by the crossover calculator 41, and the amount of purged gas calculated by the purge calculator 42.

The initial amount prediction part 44 may predict the initial amount of gas based on a previously estimated concentration of the gas or may an initial concentration of gas using stop time data of the fuel cell or current state data of the fuel cell when the fuel cell is re-started.

The crossover calculator 41 may calculate the amount of crossed over gas by integrating a gas diffusion rate over time due to a gas partial pressure difference between the anode side and the cathode side.

The purge calculator 42 may calculate a purge rate of each gas by multiplying a total gas purge rate by a mole fraction of each gas and may calculate the amount of purged gas by integrating the gas purge rate of each gas overtime.

The total gas purge rate may be proportional to a pressure difference between a gas pressure at the anode side and a gas pressure at the outside. The gas pressure at the anode side may be measured using an anode pressure sensor 23 disposed at the anode side of the fuel cell. The outside discharging the purged gas may be an outlet side of the air passed through the fuel cell stack 10. Therefore, a cathode pressure sensor 60 may be provided at the outlet side of the air passed through the fuel cell stack 10 and may measure the gas pressure of the outside.

In one embodiment, the initial amount prediction part 44 may predict an initial amount of nitrogen and an initial amount of vapor at the anode side, the crossover calculator 41 may calculate an amount of crossed over nitrogen and an amount of crossed over vapor at the anode side, the purge calculator 42 may calculate an amount of purged nitrogen and the amount of purged vapor at the anode side, and the concentration estimator 43 may calculate a current amount of nitrogen at the anode side based on the initial amount of nitrogen, the amount of crossed over nitrogen, and the amount of purged nitrogen, calculate a current amount of vapor at the anode side based on the initial amount of vapor, the amount of crossed over vapor, and the amount of purged vapor, and estimate a current hydrogen concentration at the anode side using the current amount of nitrogen, the current amount of vapor, and a total amount of gas at the anode side.

The total amount of gas at the anode side may be calculated using the gas pressure at the anode side, which is measured by the anode pressure sensor 23, and the ideal gas state equation. Further, although not shown in the drawing, a temperature sensor (not shown) for measuring a temperature of the anode side may further be included and may be used in the ideal gas state equation.

The hydrogen supply system 20 may include a recirculation line (not shown) for supplying the hydrogen passed through the fuel cell stack 10 back thereto, and a hydrogen supply line (not shown) for adding hydrogen of the hydrogen tank 30 to the gas in the recirculation line and supplying the hydrogen-added gas to the fuel cell stack 10. Further, a fuel ejector and a fuel supply valve 22 provided between the recirculation line for supplying the hydrogen passed through the fuel cell stack 10 again to the fuel cell 10 and a fuel supply line for the hydrogen of the hydrogen tank 30 to the fuel cell may be included, and the controller may control the fuel ejector and the fuel supply valve 22 to control the gas pressure at the anode side so as to vary the hydrogen concentration at the anode side.

In the present disclosure, the anode side of the fuel cell may refer to not only a hydrogen electrode in the fuel cell stack 10 but also the overall hydrogen supply system 20.

Further, the hydrogen supply system 20 includes a purge valve 21 provided at the recirculation line for supplying the gas passed through the fuel cell stack 10 back thereto and configured to discharge the gas at the anode side to the outside, and the controller 50 may control the purge valve 21 to control purging for discharging the gas at the anode side to the outside so as to vary the hydrogen concentration at the anode side.

Figure 6:
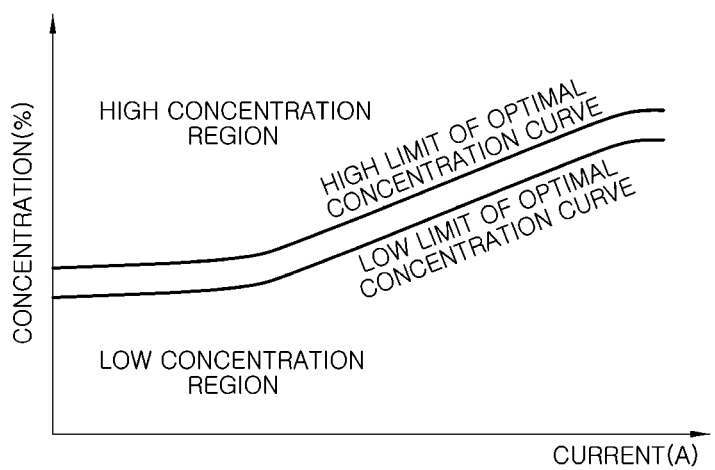
FIG. 6 is a graph illustrating an optimum hydrogen concentration for each of output currents of the fuel cell.

FIG. 6 is a graph illustrating an optimum hydrogen concentration for each of output currents of the fuel cell.

Referring to FIG. 6, the controller 50 may pre-map and store an optimal hydrogen concentration according to the output current of the fuel cell as shown in FIG. 6. When the hydrogen concentration at the anode side of the fuel cell is high, the crossed over hydrogen increases to cause a problem of degrading fuel efficiency, and when the hydrogen concentration at the anode side of the fuel cell is low, hydrogen is insufficient in terms of a reaction to cause a problem of shortening the lifetime of the fuel cell stack 10. The optimal hydrogen concentration takes into account all of these situations, and upper and lower limits of the optimal hydrogen concentration may be respectively mapped.

The controller 50 may control the stored optimal hydrogen concentration according to the output current of the fuel cell using the hydrogen concentration at the anode side, which is estimated by the hydrogen concentration estimation system 40 of the fuel cell. That is, the controller 50 may control the hydrogen supply system 20 such that the hydrogen concentration at the anode side is within a range of the stored optimal hydrogen concentration.

Specifically, the controller 50 may use a closed loop control through feedback control so that the hydrogen concentration at the anode side of the fuel cell, which is estimated by the hydrogen concentration estimation system 40, converges on a stored target hydrogen concentration. Therefore, when the hydrogen concentration estimated by the hydrogen concentration estimation system 40 is correct, there is an effect in that hydrogen concentration purging is robustly possible even in disturbance.

Generally, the hydrogen concentration at the anode side may be controlled using a method of controlling the purge valve 21 provided at the recirculation line supplied to the fuel cell while the fuel cell is operated and configured to discharge the gas at the anode side to the outside. For example, a method may be used such that, when the hydrogen concentration at the anode side of the fuel cell, which is estimated by the hydrogen concentration estimation system 40, reaches the lower limit of the optimal hydrogen concentration while the fuel cell is operated, the purge valve 21 is opened, and when the hydrogen concentration at the anode side reaches the upper limit of the optimal hydrogen concentration, the purge valve 21 is closed.

Accordingly, there is an effect in that the hydrogen concentration at the anode side of the fuel cell may be immediately controlled through control of opening or closing of the purge valve 21.

Further, the controller 50 may control the fuel ejector and the fuel supply valve 22 which are provided between the recirculation line (not shown) for supplying the hydrogen passed through the fuel cell back thereto so as to vary the hydrogen concentration at the anode side, and the fuel supply line (not shown) for supply the hydrogen of the hydrogen tank 30 to the fuel cell.

When the fuel cell system is re-started after being stopped or a fuel cell power generation stop (FC Stop) during running while a vehicle is traveling, since it may a state in which the hydrogen concentration at the anode side of the fuel cell is rapidly lowered, the hydrogen concentration at the anode side of the fuel cell may be rapidly increased through control of raising a gas pressure at the anode side of the fuel cell. That is, the fuel ejector and the fuel supply valve 22 may be controlled to increase a hydrogen supply amount from the hydrogen tank 30 to the fuel cell, such that the gas pressure at the anode side of the fuel cell may be raised.

Further, the hydrogen supply system 20 may be controlled to vary the hydrogen concentration at the anode side through other methods.

Figure 7:
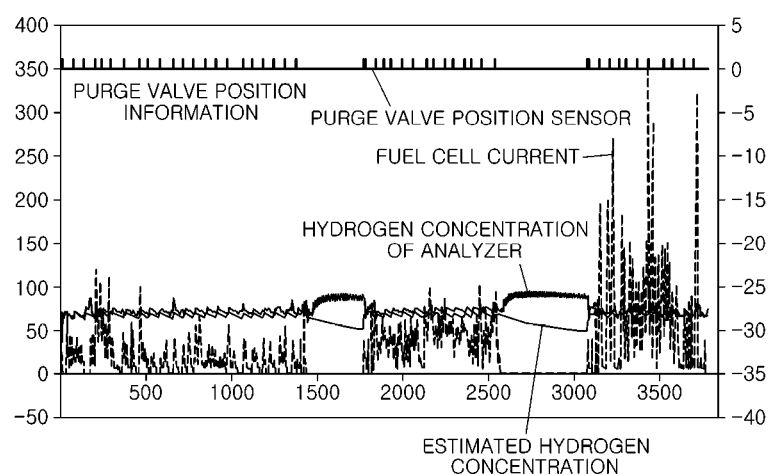
FIG. 7 is a graph illustrating an estimated hydrogen concentration and a hydrogen concentration of an analyzer according to a method and a system for estimating a hydrogen concentration estimation of a fuel cell according to one embodiment of the present disclosure.

FIG. 7 is a graph illustrating an estimated hydrogen concentration and a hydrogen concentration of an analyzer according to a method and a system for estimating a hydrogen concentration estimation of a fuel cell according to one embodiment of the present disclosure.

Referring to FIG. 7, it can be determined that there is an error in the measured hydrogen concentration of the analyzer because the hydrogen concentration at the anode side measured by the analyzer is rather increased in the section where the output current of the fuel cell is zero (FC stop section). In other sections, it can be seen that the error between the estimated hydrogen concentration according to the hydrogen concentration estimation system of the fuel cell according to one embodiment of the present disclosure and the hydrogen concentration estimated by the analyzer according to one embodiment of the present disclosure is within 5% such that the hydrogen concentration may be accurately estimated.

Further, it can also be seen that the hydrogen concentration is maintained at an appropriate level for each output current. Therefore, it has been proved that the purge control and the like are properly performed according to the accurate hydrogen concentration estimation, and thus the optimal hydrogen concentration can be maintained.

According to the method and the system for estimating a hydrogen concentration of a fuel cell of the present disclosure, there is an effect in that the hydrogen concentration at the anode side of the fuel cell, which is a control target, can be accurately estimated.

Further, there is an effect in that the hydrogen concentration at the anode side of the fuel cell can be appropriately maintained through the purge control or the pressure control.

Further, there is an effect in that the optimal hydrogen concentration can be maintained such that durability of the fuel cell stack can be secured.

In addition, there are effects in that the optimal hydrogen concentration can be maintained such that the fuel efficiency of the fuel cell is improved, and it is possible to satisfy the environmental standard of the exhaust gas according to the purge control.

Although specific embodiments of the present disclosure have been described and illustrated, those skilled in the art will appreciate that various alternations and modifications are possible without departing from the technical spirit of the present disclosure as disclosed in the appended claims.

What is claimed is:

1. A method for estimating a hydrogen concentration at an anode side of a fuel cell in a hydrogen concentration control system including the fuel cell, a hydrogen supply system for supplying hydrogen to the fuel cell, a hydrogen concentration estimation system for estimating a hydrogen concentration at the anode side, and a controller for controlling the hydrogen supply system based on the hydrogen concentration estimated by the hydrogen concentration estimation system, the hydrogen concentration estimation system including an initial amount predictor, a crossover calculator, a purge calculator, and a concentration estimator, the fuel cell including the anode side for supplying hydrogen to the fuel cell, a cathode side for supplying oxygen to the fuel cell, and an electrolyte membrane disposed between the anode side and the cathode side, the method comprising:

predicting, by the initial amount predictor, an initial amount of gas contained at the anode side of the fuel cell based on a previously estimated concentration of the gas or using stop time data of the fuel cell or current state data of the fuel cell when the fuel cell is re-started;

calculating, by the crossover calculator and the purge calculator, an amount of gas crossed over between the anode side and the cathode side of the fuel cell and an amount of gas purged from the anode side to the outside from a prediction time of the initial amount of gas to a current time, respectively; and estimating, by a concentration estimator, a current hydrogen concentration at the anode side based on the predicted initial amount of gas, the calculated amount of crossed over gas, and the amount of purged gas.

2. The method of claim 1, wherein the calculating of the amount of crossed over gas and the amount of purged gas includes integrating a gas diffusion rate over time due to a gas partial pressure difference between the anode side and the cathode side to calculate the amount of crossed over gas.

3. The method of claim 2, wherein the gas diffusion rate is inversely proportional to a thickness of the electrolyte membrane of the fuel cell stack and is proportional to the gas partial pressure difference between the anode side and the cathode side.

4. The method of claim 3, wherein the gas diffusion rate is proportional to the gas diffusion coefficient, and the gas diffusion coefficient is varied according to a water content and a temperature of the electrolyte membrane disposed between the anode side and the cathode side of the fuel cell.

5. The method of claim 1, wherein the calculating of the amount of crossed over gas and the amount of purged gas includes calculating a purge rate of each gas by multiplying a total gas purge rate by a mole fraction of each gas and calculating the amount of purged gas by integrating the purge rate of each gas over time.

6. The method of claim 5, wherein the total gas purge rate is proportional to a pressure difference between a gas pressure at the anode side and a gas pressure at the outside.

7. The method of claim 1, wherein:

the predicting of the initial amount of gas includes predicting an initial amount of nitrogen and an initial amount of vapor at the anode side, respectively, the calculating of the amount of crossed over gas and the amount of purged gas includes calculating an amount of crossed over nitrogen and an amount of crossed over vapor, and an amount of purged nitrogen and an amount of purged vapor at the anode side, respectively, and the estimating of the current hydrogen concentration at the anode side includes calculating a current amount of nitrogen at the anode side based on the initial amount of nitrogen, the amount of crossed over nitrogen, and the amount of purged nitrogen, calculating a current amount of vapor at the anode side based on a predicted initial amount of vapor, the amount of crossed over vapor, and the amount of purged vapor, and estimating a current hydrogen concentration at the anode side using the current amount of nitrogen, the current amount of vapor, and a total gas amount at the anode side.

* * * * *